(12) United States Patent
Cheng

(10) Patent No.: US 11,417,928 B2
(45) Date of Patent: *Aug. 16, 2022

(54) BATTERY HOLDING MECHANISM FOR BEING BUILT IN WIRELESS TRANSMITTER AND RECEIVER DEVICE

(71) Applicant: MIPRO ELECTRONICS CO., LTD., Chiayi (TW)

(72) Inventor: Sue Cheng, Taibao (TW)

(73) Assignee: MIPRO ELECTRONICS CO., LTD., Chiayi (TW)

( * ) Notice: Subject to any disclaimer, the term of this patent is extended or adjusted under 35 U.S.C. 154(b) by 268 days.

This patent is subject to a terminal disclaimer.

(21) Appl. No.: 16/895,225

(22) Filed: Jun. 8, 2020

(65) Prior Publication Data

US 2021/0218003 A1 Jul. 15, 2021

(30) Foreign Application Priority Data

Jan. 15, 2020 (TW) .................. 109200596

(51) Int. Cl.
*H04B 1/38* (2015.01)
*H01M 50/213* (2021.01)
*H04B 1/3883* (2015.01)
*H04R 1/08* (2006.01)

(52) U.S. Cl.
CPC ........ *H01M 50/213* (2021.01); *H04B 1/3883* (2013.01); *H04R 1/08* (2013.01); *H01M 2220/30* (2013.01); *H04R 2420/07* (2013.01)

(58) Field of Classification Search
CPC .... H01M 50/10; H01M 50/23; H01M 50/202; H01M 50/204; H01M 50/247; H01M 50/258; H01M 50/267; H04B 1/3883; H04R 1/08
See application file for complete search history.

(56) References Cited

U.S. PATENT DOCUMENTS

| | | | |
|---|---|---|---|
| 6,548,987 B1 * | 4/2003 | Oster | H02J 7/0045 320/114 |
| 6,778,814 B2 * | 8/2004 | Koike | H04B 1/04 455/127.1 |
| 2009/0304196 A1 * | 12/2009 | Patton | H04R 3/04 381/103 |
| 2021/0218002 A1 * | 7/2021 | Cheng | H01M 10/44 |

* cited by examiner

*Primary Examiner* — Tuan Pham
(74) *Attorney, Agent, or Firm* — Muncy, Geissler, Olds & Lowe, P.C.

(57) ABSTRACT

A battery holding mechanism is adapted to selectively accommodate a first battery having a larger outer diameter, or two second batteries each having a smaller outer diameter. The battery holding mechanism includes a battery holder and a resilient positioning member. The battery holder defines therein an installation space configured to permit only the first battery or only the second batteries to be installed. When the first battery is installed, the first battery is positioned by the resilient positioning member. When the second batteries are installed, the second batteries are positioned by the resilient positioning member in a juxtaposed manner.

8 Claims, 6 Drawing Sheets

BATTERY HOLDING MECHANISM FOR BEING BUILT IN WIRELESS TRANSMITTER AND RECEIVER DEVICE

CROSS-REFERENCE TO RELATED APPLICATION

This application claims priority from Taiwanese utility model patent application no. 109200596, filed on Jan. 15, 2020.

FIELD

The disclosure relates to a battery holder, more particularly to a battery holding mechanism for being built in a wireless transmitter and receiver device.

BACKGROUND

Wireless transmitter and receiver devices are currently available in two designs for two different kinds of batteries. One kind of the batteries are disposable batteries such as AA batteries and the other kind of the batteries are rechargeable lithium batteries, such as ICR-18500 batteries. Because the two kinds of batteries have different sizes, one wireless transmitter and receiver device may be suitable for being installed with only one kind of the batteries. A user may want to select different kinds of the batteries for different purposes and occasions. Therefore, manufacturers must make the wireless transmitter and receiver devices in the two different designs, and apply for wireless regulatory certification for both the two designs. As such, the conventional wireless transmitter and receiver devices may have a relatively high cost in manufacturing and selling, and may be relatively inconvenience to the user.

SUMMARY

Therefore, an object of the disclosure is to provide a battery holding mechanism for being built in a wireless transmitter and receiver device, which overcomes at least one drawback of the prior art mentioned above.

According to the disclosure, a battery holding mechanism is for being built in a wireless transmitter and receiver device, and is adapted to selectively accommodate a first battery having a first outer diameter, or two second batteries each having a second outer diameter smaller than the first outer diameter. The battery holding mechanism includes a battery holder and a resilient positioning member. The battery holder defines therein an installation space which extends in an X direction and which is configured to selectively permit only the first battery to be axially installed in the installation space in the X direction, or permit only the second batteries to be axially installed in the installation space in the X direction in a juxtaposed manner. The resilient positioning member is connected to the battery holder, and is configured such that when the first battery is installed in the installation space, the resilient positioning member is disposed to resiliently abut against the first battery in a Z direction orthogonal to the X direction to thereby position the first battery within the battery holder, and such that when the second batteries are installed in the installation space, the resilient positioning member is disposed to resiliently abut against a first one of the second batteries in the Z direction to force the first one of the second batteries into abutment against the second one of the second batteries to thereby position the second batteries within the battery holder in the juxtaposed manner.

With the provision of the battery holding mechanism built in the wireless transmitter and receiver device, the wireless transmitter and receiver device may be installed with two disposable AA batteries or one rechargeable ICR-18500 lithium battery based on user requirement.

BRIEF DESCRIPTION OF THE DRAWINGS

Other features and advantages of the disclosure will become apparent in the following detailed description of the embodiment(s) with reference to the accompanying drawings, in which.

DETAILED DESCRIPTION

Figure 1:
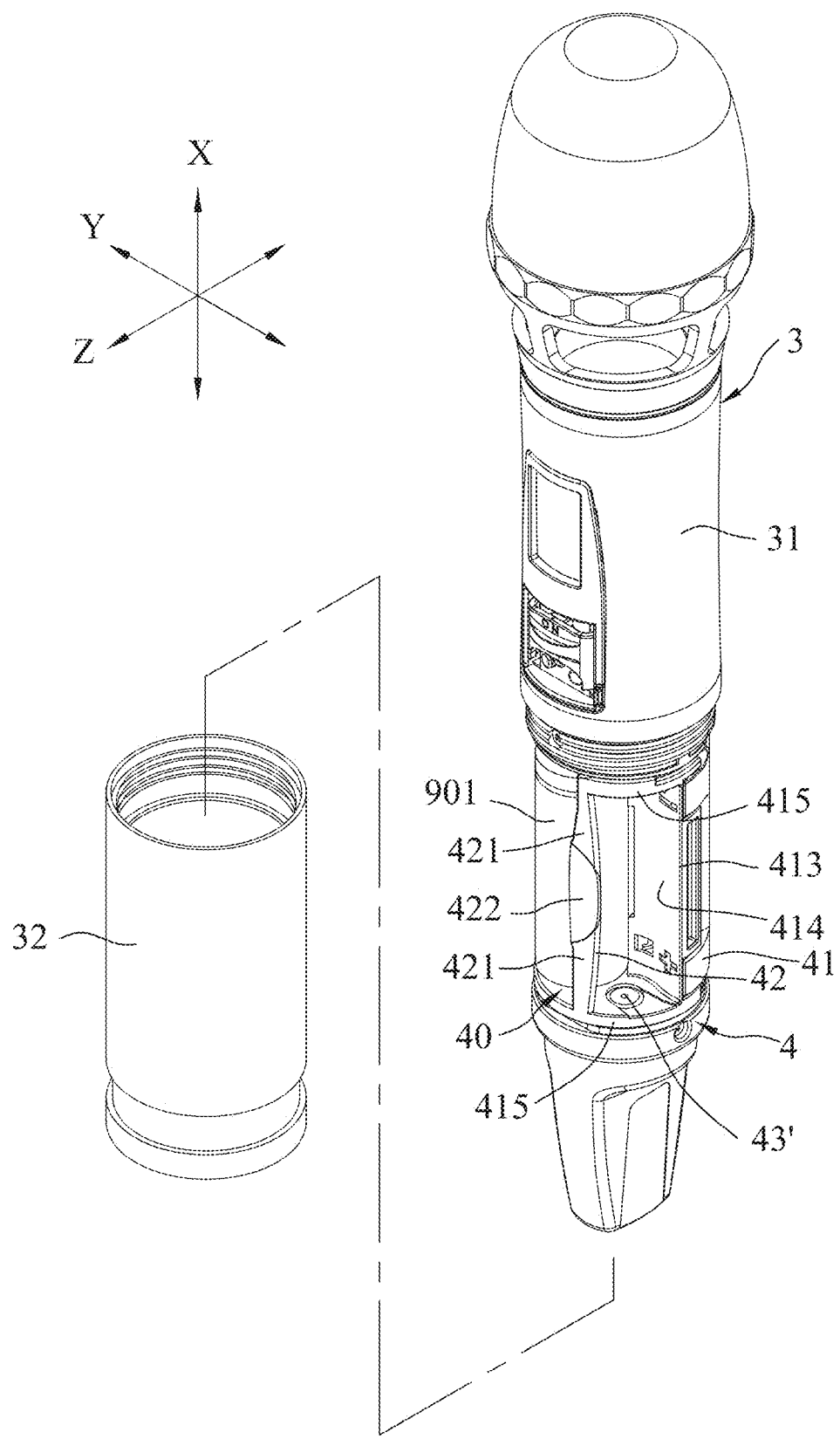
FIG. 1 is a partially exploded perspective view of a wireless transmitter and receiver device with a battery holding mechanism according to an embodiment of the disclosure.

Before the disclosure is described in greater detail, it should be noted that where considered appropriate, reference numerals have been repeated among the figures to indicate corresponding or analogous elements, which may optionally have similar characteristics.

Figure 3:
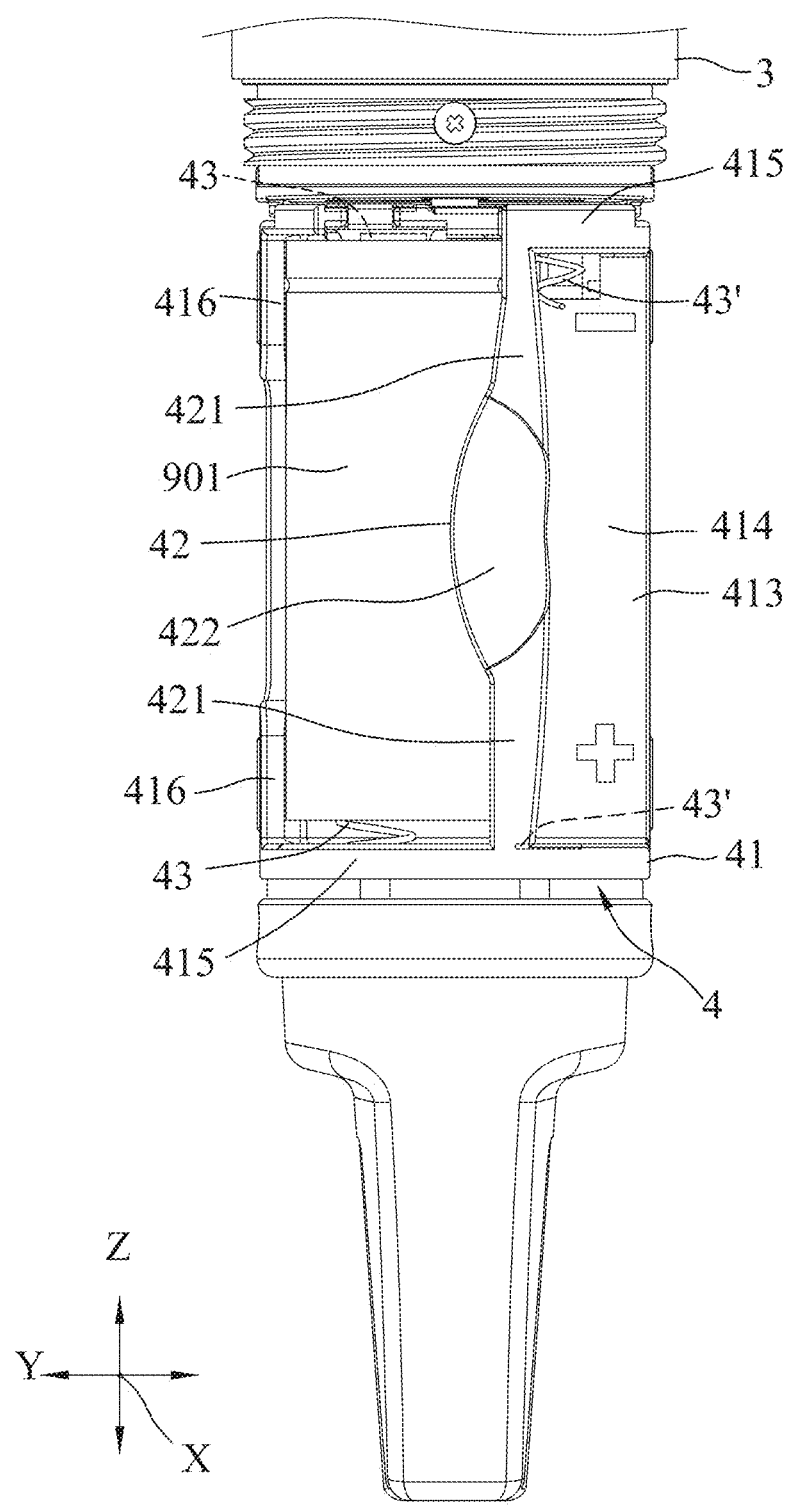
FIG. 3 is a fragmentary front view of the wireless transmitter and receiver device, illustrating when a first battery is installed in the battery holding mechanism.
Figure 5:
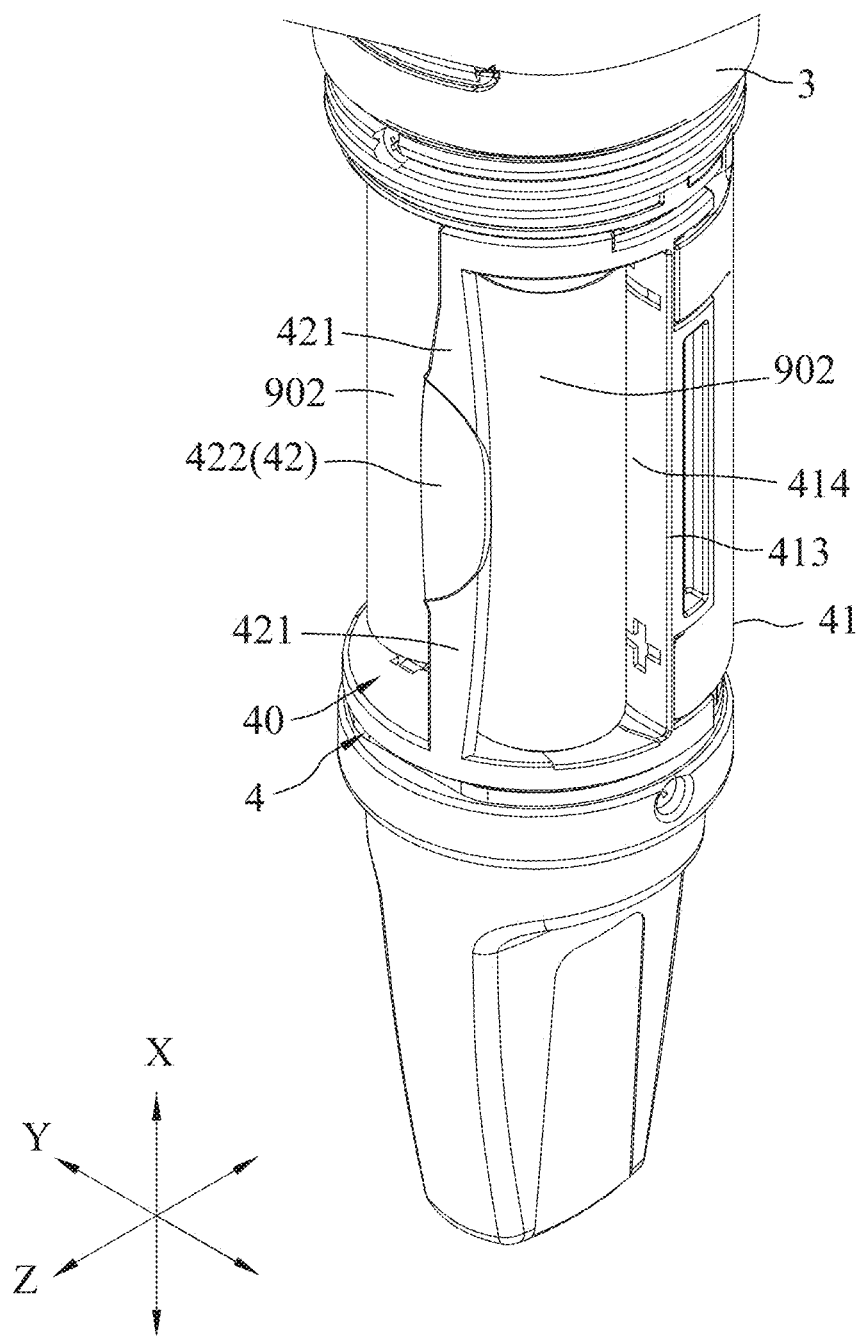
FIG. 5 is a fragmentary front view of the wireless transmitter and receiver device, illustrating when two second batteries are installed in the battery holding mechanism.

As shown in FIGS. 1, 3, and 5, a battery holding mechanism 4 according to an embodiment of the disclosure is for being built in a wireless transmitter and receiver device 3, and is adapted to selectively accommodate a first battery 901 having a first outer diameter, or two second batteries 902 each having a second outer diameter smaller than the first outer diameter. The first battery 901 may be, but is not limited to, a rechargeable ICR-18500 lithium battery, and each of the second batteries 902 may be, but is not limited to, a disposable AA battery.

The wireless transmitter and receiver device 3 may be a device for wireless transmitting and receiving voice signals, such as wireless microphones, wearable wireless transmitters, wearable wireless receivers, and so on. The wearable wireless transmitters may be, but are not limited to, lavalier microphones, detachable (portable) electrical pickups for musical instruments, and so on. The wearable wireless receivers may be, but are not limited to, headphones for receiving voice signals. Because the wireless transmitter and receiver device 3 is not the focus of this disclosure, the detailed thereof is omitted for the sake of brevity.

For the sake of description, a handheld wireless microphone exemplifies the wireless transmitter and receiver device 3. The handheld microphone 3 may includes a handgrip 31 extending lengthwise in an X direction (an up-down direction of the handheld microphone), and a tubular battery cover 32 extending in the X direction and detachably assembled to the handgrip 31. The handheld microphone 3 further defines a Y direction (a left-right direction) orthogonal to the X direction, and a Z direction (a front-rear direction) orthogonal to both the X and Y directions.

Figure 2:
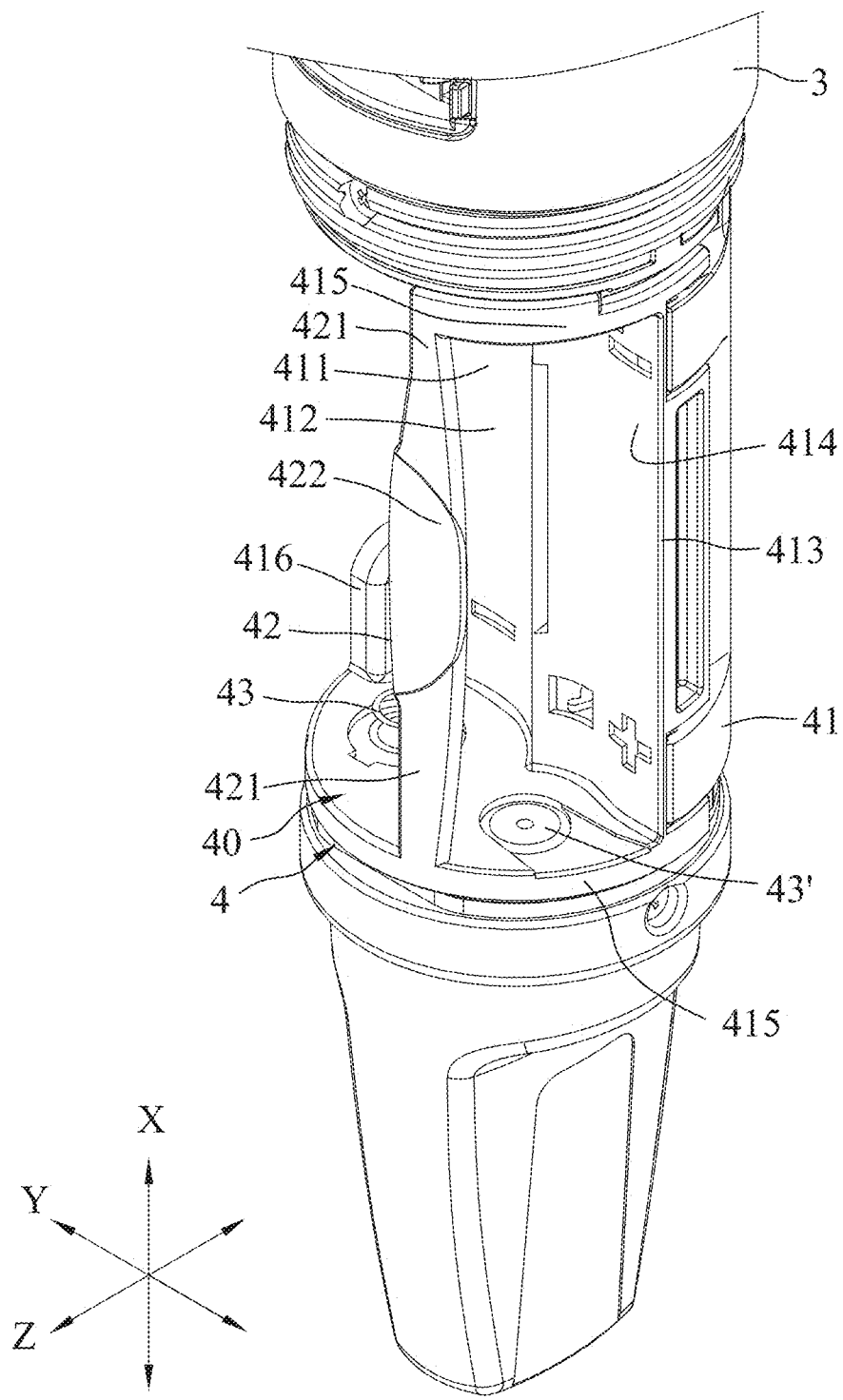
FIG. 2 is a fragmentary enlarged perspective view illustrating the battery holding mechanism built in the wireless transmitter and receiver device.
Figure 4:
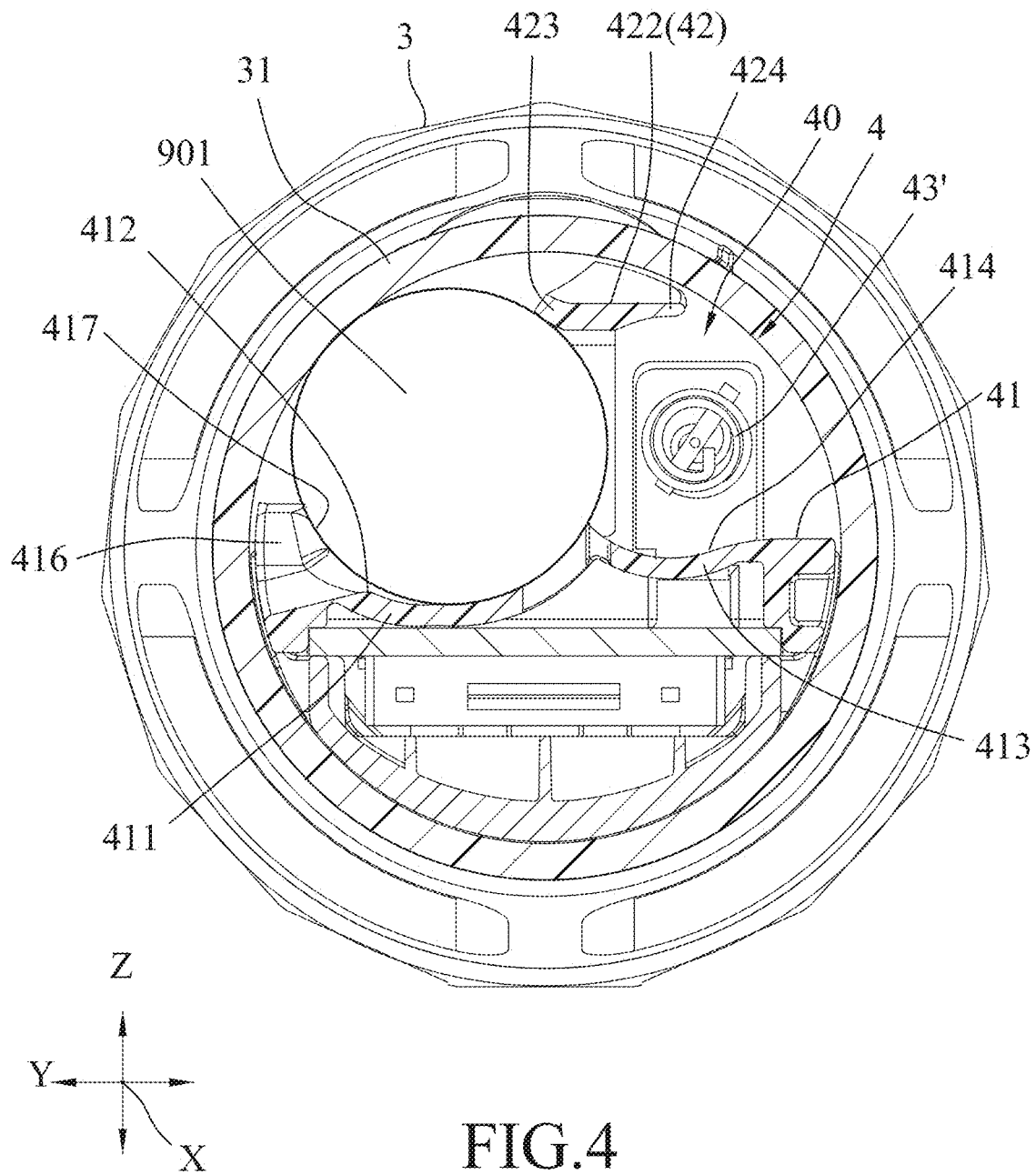
FIG. 4 is a cross-sectional view of FIG. 3.
Figure 6:
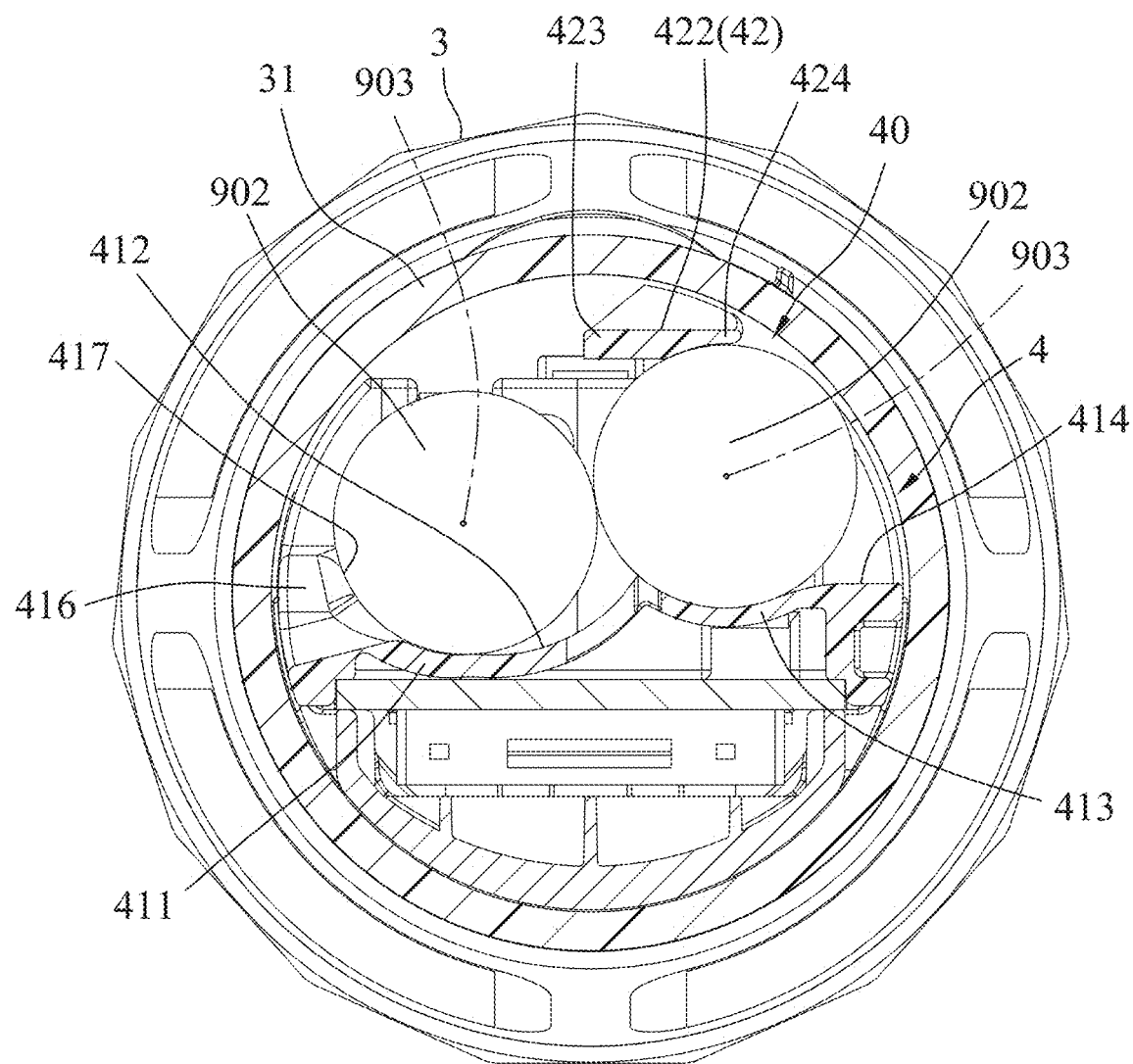
FIG. 6 is a cross-sectional view of FIG. 5.

Referring to FIGS. 2, 4, and 6, the battery holding mechanism is shown to include a battery holder 41 and a resilient positioning member 42. The battery holder 41 is built in and exposed outwardly from a bottom segment of the handgrip 31. The resilient positioning member 42 extends in the X direction and is connected to a front side of the battery holder 41.

The battery holder 41 defines therein an installation space 40 which extends in the X direction and which is configured to selectively permit only the first battery 901 to be axially installed in the installation space 40 in the X direction, or permit only the second batteries 902 to be axially installed in the installation space 40 in the X direction in a juxtaposed manner.

The resilient positioning member 42 is configured such that when the first battery 901 is installed in the installation space 40, the resilient positioning member 42 is disposed to resiliently abut against the first battery 901 in the Z direction to thereby position the first battery 901 within the battery holder 41, and such that when the second batteries 902 are installed in the installation space 40, the resilient positioning member 42 is disposed to resiliently abut against a first one of the second batteries 902 (the right second battery 902 shown in FIG. 6) in the Z direction to force the first one of the second batteries 902 into abutment against a second one of the second batteries 902 (the left second battery 902 shown in FIG. 6) to thereby position the second batteries 902 within the battery holder 41 in the juxtaposed manner. The resilient positioning member 42 may be made of a plastic deformable material.

In an embodiment shown in FIGS. 2, 4, and 6, the battery holder 41 may include a first body segment 411 and a second body segment 413 which are displaced from each other in the Y direction. The first body segment 411 has a first abutment surface 412 configured for selectively abutting against an outer periphery of the first battery 901 or an outer periphery of the second one of the second batteries 902 (the left second battery 902). The second body segment 413 has a second abutment surface 414 configured for abutting against an outer periphery of the first one of the second batteries 902 (the right second battery 902). Each of the first and second abutment surfaces 412, 414 may be a curved surface. The first and second abutment surfaces 412, 414 define a level difference to permit axles 903 of the second batteries 902 installed in the installation space 40 to be in different levels in the Z direction. The resilient positioning member 42 is spaced apart from the first and second body segments 411, 413 in the Z direction.

In an embodiment shown in FIGS. 2, 4, and 6, a distance between the resilient positioning member 42 and the second abutment surface 414 may be smaller than a distance between the resilient positioning member 42 and the first abutment surface 412. The resilient positioning member 42 may be disposed to selectively permit the first battery 901 to be resiliently abutted between the resilient positioning member 42 and the first abutment surface 412, or permit the first one of the second batteries 902 (the right second battery 902 shown in FIG. 6) to be resiliently abutted between the resilient positioning member 42 and the second abutment surface 414.

In an embodiment shown in FIGS. 2, 4, and 6, the battery holder 41 may further include a stop segment 416 which is connected to a left side of the first body segment 411 opposite to the second body segment 413 in the Y direction, and which has a stop surface 417 configured for selectively abutting against the first battery 901 or the second one of the second batteries 902 (the left second battery 902 shown in FIG. 6). The stop surface 417 may have the same curvature as the first abutment surface 412.

In embodiment shown in FIG. 2, the battery holder 41 may include two of the stop segments 416 which are spaced apart from each other in the X direction.

In an embodiment shown in FIGS. 1 to 3, the battery holder 41 may further include two end wall portions 415 which are spaced apart from each other in the X direction. An upper one of the end wall portions 415 is connected to upper ends of the first and second body segments 411, 413, and a lower one of the end wall portions 415 is connected to lower ends of the first and second body segments 411, 413. The two end portions 415, the first and second body segments 411, 413, and the stop segments 416 cooperatively define the installation space 40 therebetween.

In an embodiment shown in FIGS. 1, 2, 4, and 6, the resilient positioning member 42 may include two connection segment 421 and an abutment segment 422. The connection segments 421 are respectively connected to the end wall portions 415 of the battery holder 41, and are spaced apart from each other in the X direction. The abutment segment 422 is connected between the connection segments 421, is arc-shaped, and is curved toward the first and second body segments 411, 413 for selectively and resiliently abutting against the outer periphery of the first battery 901 (see FIG. 4) or the outer periphery of the first one of the second batteries 902 (the right second battery 902 shown in FIG. 6).

In an embodiment shown in FIGS. 4 and 6, the abutment segment 422 may include a first positioning region 423 and a second positioning region 424. The first positioning region 423 is spaced apart from the first abutment surface 412 in the Z direction, and is configured to permit only the first battery 901 to be resiliently abutted between the first positioning region 423 and the first abutment surface 412. The second positioning region 424 is connected and opposite to the first positioning region 423 in the Y direction, and is spaced apart from the second abutment surface 414 in the Z direction. The second positioning region 424 is configured to permit only one of the second batteries 902 to be resiliently abutted between the second positioning region 424 and the second abutment surface 414. Each of the first and second positioning regions 423, 424 may be arc-shaped.

Furthermore, a distance between the first positioning region 423 and the first abutment surface 412 is slightly smaller than the first outer diameter of the first battery 901. A distance between the second positioning region 424 and the second abutment surface 414 is smaller than the distance between the first positioning region 423 and the first abutment surface 412 and is slightly smaller than the second outer diameter of each second battery 902. With such arrangement, the first battery 901 may be prevented from being installed between the second positioning region 424 and the second abutment surface 414.

In the case that the first battery 901 is installed in the installation space 40 (FIG. 4), the resilient positioning member 42 is deformed by the first battery 901 and the first battery 901 is resiliently brought by the first positioning region 423 into abutment with the first body segment 411 and the stop segments 416 to thereby permit the first battery 901 to be resiliently positioned within the battery holder 41. In this case, no more batteries 901 or 902 can be further installed in the installation space 40.

In the case that the second batteries 902 are installed in the installation space 40 (FIG. 6), due to the level difference between the first and second abutment surfaces 412, 414, the outer periphery of the right second battery 902 arranged on the second body segment 413 has a rear left portion in abutting engagement with a front right portion of the outer periphery of the left second battery 902 arranged on the first body segment 411. The right second battery 902 arranged on the second body segment 413 is resiliently brought by the second positioning portion 424 of the resilient positioning member 42 into abutting engagement with the left second battery 902 arranged on the first body segment 411 to thereby force the left second battery 902 into abutting engagement with the stop segments 416. Because the right second battery 902 is positioned between the resilient positioning member 42 and the second body segment 413, the left second battery 902, abutted by the right second battery 902, may be prevented from undesirably moving out of the installation space 40. In this case, the two second batteries 902 may be stably installed in the installation space 40.

In an embodiment shown in FIGS. 1 to 3, the battery holding mechanism 4 may further includes a pair of first electrodes 43 and a pair of second electrodes 43'. The first electrodes 43 are respectively mounted on the end wall portions 415 in the installation space 40 to be spaced apart from each other in the X direction. The second electrodes 43' are respectively mounted on the end wall portions 415 in the installation space 40 to be spaced apart from each other in the X direction, and are respectively spaced apart from the first electrodes 43 in the Y direction. In this embodiment, the first electrodes 43 are configured for being selectively in electrical contact with two electrodes (not shown) of the first battery 901 or two electrodes (not shown) of the second one of the second batteries 902 (the left second battery 902 shown in FIG. 6). The second electrodes 43' are configured for being in electrical contact with two electrodes (not shown) of the first one of the second batteries 902 (the right second battery 902 shown in FIG. 6). The provision of the electrodes for electrically connection with the batteries is well known in the art, the details thereof are omitted for brevity.

In sum, with the provision of the battery holding mechanism 4 built in the wireless transmitter and receiver device 3, the wireless transmitter and receiver device 3 may be stably installed with the first battery 901 having a large outer diameter or two second batteries 902 each having a smaller outer diameter. In view of the arrangement of the battery holder 41 and the resilient positioning member 42, the first battery 901 or the second batteries 902 may be prevented from undesirably moving out of the installation space 40. Therefore, the battery holding mechanism 4, without rearranging the structure, is adapted to selectively accommodate two kinds of batteries, e.g., two disposable AA batteries or one rechargeable ICR-18500 lithium battery, based on user requirement.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A battery holding mechanism which is for being built in a wireless transmitter and receiver device, and which is adapted to selectively accommodate a first battery having a first outer diameter, or two second batteries each having a second outer diameter smaller than the first outer diameter, said battery holding mechanism comprising:

a battery holder defining therein an installation space which extends in an X direction and which is configured to selectively permit only the first battery to be axially installed in the installation space in the X direction, or permit only the second batteries to be axially installed in the installation space in the X direction in a juxtaposed manner; and a resilient positioning member which is connected to said battery holder, and which is configured such that when the first battery is installed in the installation space, said resilient positioning member is disposed to resiliently abut against the first battery in a Z direction orthogonal to the X direction to thereby position the first battery within said battery holder, and such that when the second batteries are installed in the installation space, said resilient positioning member is disposed to resiliently abut against a first one of the second batteries in the Z direction to force the first one of the second batteries into abutment against a second one of the second batteries to thereby position the second batteries within said battery holder in the juxtaposed manner.

2. The battery holding mechanism according to claim 1, wherein said battery holder includes a first body segment and a second body segment which are displaced from each other in a Y direction orthogonal to both the X and Z directions, wherein said first body segment has a first abutment surface configured for selectively abutting against an outer periphery of the first battery or an outer periphery of the second one of the second batteries, wherein said second body segment has a second abutment surface configured for abutting against an outer periphery of the first one of the second batteries, wherein said first and second abutment surfaces define a level difference to permit axles of the second batteries installed in said installation space to be in different levels in the Z direction, and wherein said resilient positioning member is spaced apart from said first and second body segments in the Z direction.

3. The battery holding mechanism according to claim 2, wherein a distance between said resilient positioning member and said second abutment surface is smaller than a distance between said resilient positioning member and said first abutment surface, and wherein said resilient positioning member is disposed to selectively permit the first battery to be resiliently abutted between said resilient positioning member and said first abutment surface or permit the first one of the second batteries to be resiliently abutted between said resilient positioning member and said second abutment surface.

4. The battery holding mechanism according to claim 2, wherein said battery holder further includes a stop segment which is connected to a side of said first body segment opposite to said second body segment in the Y direction, and which is configured for selectively abutting against the first battery or the second one of the second batteries.

5. The battery holding mechanism according to claim 2, wherein said resilient positioning member includes
two connection segments which are respectively connected to said battery holder and which are spaced apart from each other in the X direction, and
an abutment segment which is connected between said connection segments, and which is arc-shaped and is curved toward said first and second body segments for selectively and resiliently abutting against the outer periphery of the first battery or the outer periphery of the first one of the second batteries.

6. The battery holding mechanism according to claim 5, wherein said abutment segment includes
a first positioning region which is spaced apart from said first abutment surface in the Z direction, and which is configured to permit the first battery to be resiliently abutted between said first positioning region and said first abutment surface, and
a second positioning region which is connected and opposite to said first positioning region in the Y direction, and which is spaced apart from said second abutment surface in the Z direction, said second positioning region being configured to permit only one of the second batteries to be resiliently abutted between said second positioning region and said second abutment surface.

7. The battery holding mechanism according to claim 5, wherein each of said first and second positioning regions is arc-shaped.

8. The battery holding mechanism according to claim 2, wherein said battery holder further includes two end wall portions which are spaced apart from each other in the X direction, each of said end wall portions being connected to both said first and second body segments, said two end portions and said first and second body segments cooperatively defining said installation space therebetween, said battery holding mechanism further comprising
a pair of first electrodes which are mounted respectively on said end wall portions in said installation space to be spaced apart from each other in the X direction, and
a pair of second electrodes which are mounted respectively on said end wall portions in said installation space to be spaced apart from each other in the X direction, and which are respectively spaced apart from said first electrodes in the Y direction.

* * * * *